No. 861,913. PATENTED JULY 30, 1907.
P. G. STORMER.
EYE TESTING INSTRUMENT.
APPLICATION FILED FEB. 28, 1907.
2 SHEETS—SHEET 1.
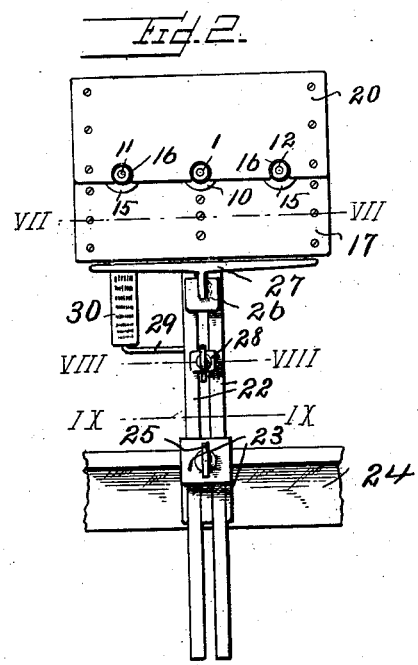
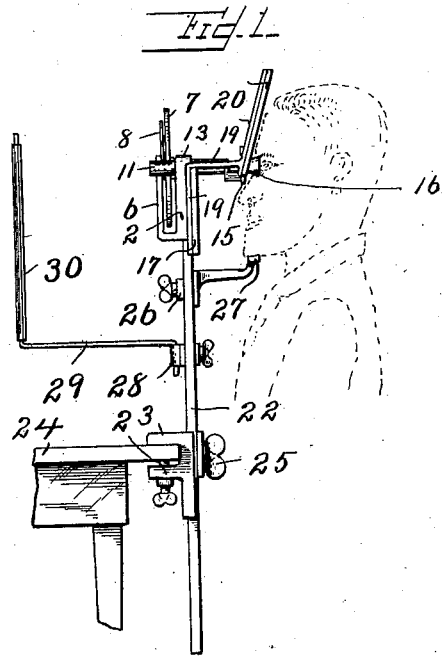
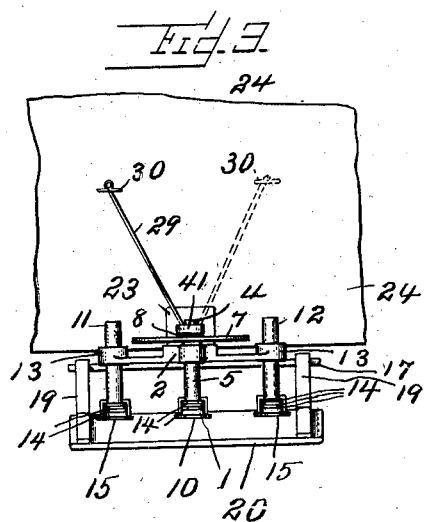
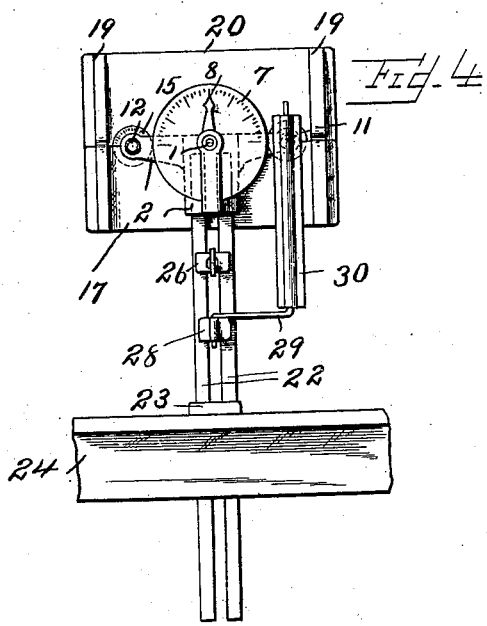
WITNESSES:
O'Connor
James Haughton
INVENTOR
P. G. Stormer
BY
Jesse B. Heller,
ATTORNEY.

No. 861,913.
PATENTED JULY 30, 1907.
P. G. STORMER.
EYE TESTING INSTRUMENT.
APPLICATION FILED FEB. 28, 1907.
2 SHEETS—SHEET 2.
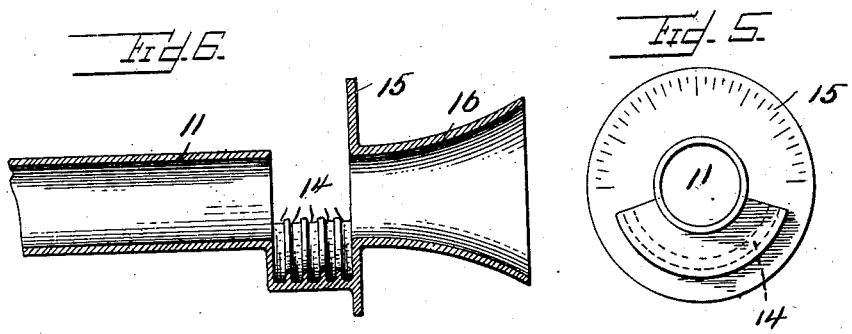
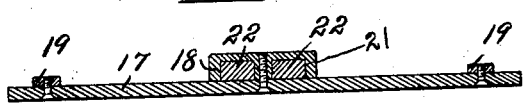
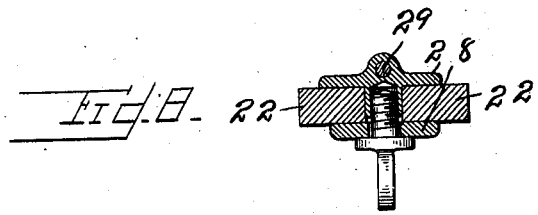
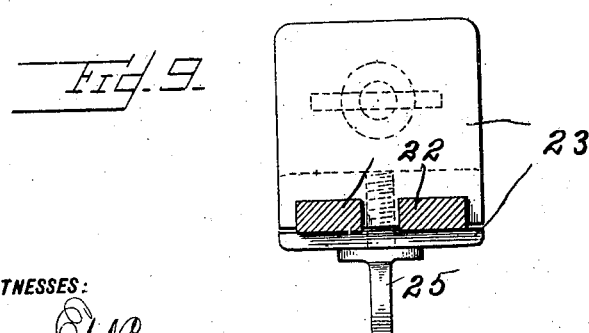
WITNESSES:
INVENTOR
P. G. Stormer
BY
Jesse B. Heller,
ATTORNEY.

UNITED STATES PATENT OFFICE.

PETER G. STORMER, OF JOHNSTOWN, PENNSYLVANIA.

EYE-TESTING INSTRUMENT.

No. 861,913.   Specification of Letters Patent.   Patented July 30, 1907.

Application filed February 28, 1907. Serial No. 359,847.

*To all whom it may concern:*

Be it known that I, PETER G. STORMER, of Johnstown, in the county of Cambria and State of Pennsylvania, have invented a new and useful Improvement in Eye-Testing Instruments, of which the following is a full, clear, and exact description, reference being had to the accompanying drawings, which form a part of this specification.

My invention relates to that class of instruments which are used by opticians in detecting the errors of refraction in the eyes of a patient, and is applicable to what is known to the trade as an "optometer". With this instrument, the angle and class of refraction is first sought, and the indicated lens is then placed into the instrument at the indicated angle. The eye is again tested to see if the error of refraction has been overcome. If the proper lens or lenses have been found for this eye, (say the right eye) their number and angular position must be recorded. They are then removed, and the left eye is tested in the same manner to find the proper lens or lenses to overcome the refraction in this eye. These lenses are also recorded as to number and inclination. The patient then moves to another point, and is given what is known as a "trial frame", and a blind disk is placed in the frame to cut off the sight of the left eye. The recorded lens or lenses for the right eye are then inserted into the trial frame in their recorded inclination, and this eye is tested for the near or reading test.
After the right eye has been tested out, the number and inclination of the different lenses are recorded, and the lenses removed from the trial frame. The blind or shield is transferred from the left eye to the right eye, and the left eye is then tested out in the same manner as the right eye was tested for the near or reading test.

The object of my invention is to overcome the necessity of the operator recording the number and inclination of the lens or lenses to overcome the error of refraction.

Another object is to make the full test with the patient seated in front of the instrument.

Another object is to overcome the use of the trial frame and its blind or shield, which is very annoying to the patient, as the operator must remove and replace the various lenses while making the various tests.

Another object of my invention is to provide an adjustable head rest which places the patient in a comfortable position, and facilitates the work as it steadies the patient's head thereby allowing him to concentrate his vision on the objective point.

Still another object of my invention is to construct the instrument so that it can be easily and quickly adjusted to suit patients of various sizes, and easily taken apart and set up for the use of traveling opticians. It is neat in appearance, and cheap of construction.

With these objects in view, my invention consists in the novel construction arrangement and combination of parts, as hereinafter described and pointed out in the appended claims, reference being had to the accompanying drawings in which:—

Figure 1, is a side elevation of my improved device attached to a table ready for use; Fig. 2, is a front view; Fig. 3 is a plan view; Fig. 4, is a rear view; Fig. 5, is a rear view of one of the side testing tubes; Fig. 6 is a vertical section through the side tube; and Figs. 7, 8 and 9 are sectional plan views on the lines VII—VII, VIII—VIII and IX—IX respectively of Fig. 2.

The numeral 1, designates the "optometer" or instrument to detect the character of refraction in a human eye. As this instrument is well known to the art, I will not describe it in detail, but sufficient to demonstrate its general use in combination with my improvement.

2 is a frame in which the prisometer is mounted.

The rotatable portion 4 of the optometer 1, is mounted within the shell 5 and the bearing 41, which is connected to the frame 2 by means of the extension 6. Secured to the rotatable portion of the optometer 1, so as to rotate therewith, is the graduated dial 7, and secured to the extension 6, is an indicator or pointer 8. In the front end of the stationary portion of the optometer are a series of compartments 14, 14, 14, for the various lenses, and on the outer end thereof is a small graduated dial 10.

Rigidly mounted in a boss 13, on each end of the frame 2, are the tubes 11 and 12, the tube 11 being on the left and the tube 12 on the right side of the instrument. The tubes 11 and 12 are each provided with a series of compartments 14, 14, 14, for the various lenses, and a stationary graduated dial 15. Projecting therefrom is the flared tube 16. 17 is a light shield which is secured to the frame 2, and secured to the outer ends of the shield 17, are the brackets 19, 19. These brackets 19, 19, project forwardly, and upwardly, and secured to the upwardly projecting portion, is the light shield 20. The shield 20, is placed in front of the stationary dials 10, 15 and 15, and straddles the flared tubes 16, 16, and the sight tube of the optometer 1, but does not project below the lower edge of the flared tubes. These shields 17 and 20 completely cut off the light from the patient, and as the shield 20 does not project below the tubes 16, 16, there is a free circulation of air.

21, 21 are sockets which are formed by the shield 17, and grooves in the frame 2. Projecting into these sockets 21, 21, are the parallel bars 22, 22. These bars project downwardly through a clamp 23, which is in turn secured to a table 24. When it is desired to raise or lower the instrument, the thumb screw 25, of the clamp 23, is slackened, and the instrument adjusted to the proper height, after which the thumb screw is tightened to secure the instrument in the proper adjustment.

Adjustably secured to the bars 22, 22, by means of the clamp 26, is a chin, or head rest 27. Secured to the bars 22, 22, below the head rest 27, is the adjustable clamp 28. Supported in this clamp 28, is one end of the rod 29, and mounted on the other end of this rod so as to slide thereon, is a test card holder 30, having a test card mounted thereon.

The operation is as follows:—The patient is seated in front of the instrument, and the operator rotates the dial 7, to find the error of refraction, and the angle thereof, in the left eye. The pointer 8, will indicate the angle of refraction by means of the graduations on the dial 7. The operator will select a lens or lenses and set them in the lens compartments 9, 9, and at the same angle with relation to the dial 10 as indicated on the dial 7, by the pointer 8. The operator rotates the dial with the lens or lenses in place, to see whether these lenses have overcome the refraction. When the operator finds the proper lenses for the left eye, he places them in their proper angular position in the lens compartments 14, 14, in the tube 11, their angular position with relation to dial 15, being the same as with relation to dial 10. The right eye is now tested in the same manner, and the lenses are placed in the lens compartments 14, 14 of the tube 12. The patient now looks through the tube 12 at a different target, placed at the proper distance, to verify the lenses to see if they overcome the errors of refraction. The near or reading test is now made for the right eye. The patient looks through the tube 12, at the card on the holder 30, which is swung into alinement with the tube 12, and the operator seeks the proper lens to combine with the others which will enable the patient to read the printed matter on the card. The left eye is now tested to verify the first lenses, and for reading, in the same manner as the right eye was tested. The operator is now through with the various tests, and having all of the lenses in their indicated positions, they can be properly recorded after the patient leaves.

Having thus fully described my invention, what I claim as new, and desire to secure by Letters Patent is:—

1. In an optical instrument, an optometer in combination with a sight tube mounted on one side thereof, the sight tube having lens compartments and a graduated dial, for the purpose specified.

2. In an optical instrument, an optometer, in combination with a sight tube mounted on each side thereof, and each of said tubes being provided with lens compartments and a graduated dial.

3. In an optical instrument, an optometer, in combination with a sight tube mounted on each side thereof, and each of said tubes being provided with lens compartments and a graduated dial, and a light shield placed over the sight tubes in front of the dials.

4. In an optical instrument, an optometer, a sight tube mounted on each side thereof, each of said tubes being provided with lens compartments and a graduated dial, in combination with a pair of light shields, one of the shields being above the tubes, and in front of the dials, and the other shield being below the tubes, and in the rear of the dials.

5. In an optical instrument, an optometer, a sight tube mounted on each side thereof, each of said tubes being provided with lens compartments and a graduated dial, in combination with a pair of light shields, one of the shields being above the tubes, and in front of the dials, and the other shield being below the tubes, and in the rear of the dials, a pair of parallel bars secured to an adjustable clamp and the frame.

6. In an optical instrument, an optometer, a sight tube mounted on each side thereof, each of said tubes being provided with lens compartments and a graduated dial, in combination with a pair of light shields, one of the shields being above the tubes, and in front of the dials, and the other shield being below the tubes, and in the rear of the dials, the whole being mounted on a pair of bars adjustably secured to a clamp, and an adjustable swinging test card for the purpose specified.

In testimony whereof, I have affixed my signature in presence of two witnesses.

PETER G. STORMER.

Witnesses:
LORETTO O'CONNELL,
H. W. SMITH.